United States Patent
Joung et al.

(10) Patent No.: US 7,760,185 B2
(45) Date of Patent: Jul. 20, 2010

(54) OPTICAL POINTING DEVICE

(75) Inventors: Chul-Yong Joung, Yongin-si (KR); Jong-Taek Kwak, Yongin-si (KR); Young-Ho Shin, Yongin-si (KR); Bang-Won Lee, Yongin-si (KR)

(73) Assignee: ATLab Inc. (KR)

( * ) Notice: Subject to any disclaimer, the term of this patent is extended or adjusted under 35 U.S.C. 154(b) by 1181 days.

(21) Appl. No.: 11/234,522

(22) Filed: Sep. 23, 2005

(65) Prior Publication Data

US 2006/0071907 A1    Apr. 6, 2006

(30) Foreign Application Priority Data

Oct. 6, 2004    (KR)    ............... 10-2004-0079679

(51) Int. Cl.
G09G 5/08    (2006.01)

(52) U.S. Cl. ..................... 345/166; 356/498

(58) Field of Classification Search ......... 345/156–166; 250/221, 559.29; 356/498
See application file for complete search history.

(56) References Cited

U.S. PATENT DOCUMENTS

| | | | | |
|---|---|---|---|---|
| 6,304,249 | B1 * | 10/2001 | Derocher et al. | 345/163 |
| 6,922,186 | B2 * | 7/2005 | Whitcomb | 345/163 |
| 6,927,759 | B2 * | 8/2005 | Chang et al. | 345/166 |
| 6,967,321 | B2 * | 11/2005 | Leong et al. | 250/239 |
| 7,394,454 | B2 * | 7/2008 | Kong | 345/163 |
| 7,399,954 | B2 * | 7/2008 | Venkatesh | 250/221 |
| 2005/0052411 | A1 * | 3/2005 | Farag et al. | 345/157 |
| 2006/0091298 | A1 * | 5/2006 | Xie et al. | 250/221 |
| 2007/0070041 | A1 * | 3/2007 | Chan et al. | 345/166 |
| 2008/0024448 | A1 * | 1/2008 | Chang | 345/166 |
| 2008/0117412 | A1 * | 5/2008 | Leong et al. | 356/73 |

FOREIGN PATENT DOCUMENTS

| | | | |
|---|---|---|---|
| JP | 59079386 A | * | 5/1984 |
| JP | 2004151927 A | * | 5/2004 |
| TW | 504638 | | 10/1991 |
| TW | 485283 | | 5/2002 |
| TW | 551561 | | 9/2003 |
| TW | 562326 Y | | 11/2003 |

OTHER PUBLICATIONS

Taiwan—Notice of Allowance; Search Report for Patent Application No. 94131984; Aug. 29, 2007.

* cited by examiner

*Primary Examiner*—Alexander S. Beck
*Assistant Examiner*—Seokyun Moon
(74) *Attorney, Agent, or Firm*—Cantor Colburn LLP (57) ABSTRACT

An optical pointing device is provided. The optical pointing device includes: a base plate; a circuit board disposed on one side of the base plate, and having a light source irradiating light and a sensor receiving a light reflected from a working surface; an optical structure disposed between the base plate and the circuit board and having a light path guiding the light irradiated from the light source to the sensor; and a light blocking mean disposed on the light path to block the light path when the base plate is separated from a predetermined position.

18 Claims, 5 Drawing Sheets

OPTICAL POINTING DEVICE

CROSS-REFERENCE TO RELATED APPLICATION

This application claims the benefit of Korean Patent Application No. 10-2004-79679, filed Oct. 6, 2004, the disclosure of which is hereby incorporated herein by reference in its entirety.

BACKGROUND OF THE INVENTION

1. Field of the Invention

The present invention relates to an optical pointing device and, more particularly, to an optical pointing device capable of preventing light emitted from a light source from dazzling user's eyes when a user turns the optical pointing device upside down.

2. Description of the Related Art

Generally, an optical pointing device, one of peripheral devices of a computer, is a device for controlling a position of a curser displayed in a display device of the computer using the reflection amount of light irradiated from a light source. In particular, since the optical pointing device can more precisely detect movement of a user's hand and can be smoothly moved in comparison with a conventional ball pointing device, the optical pointing device has been more generally used.

Figure 1A:
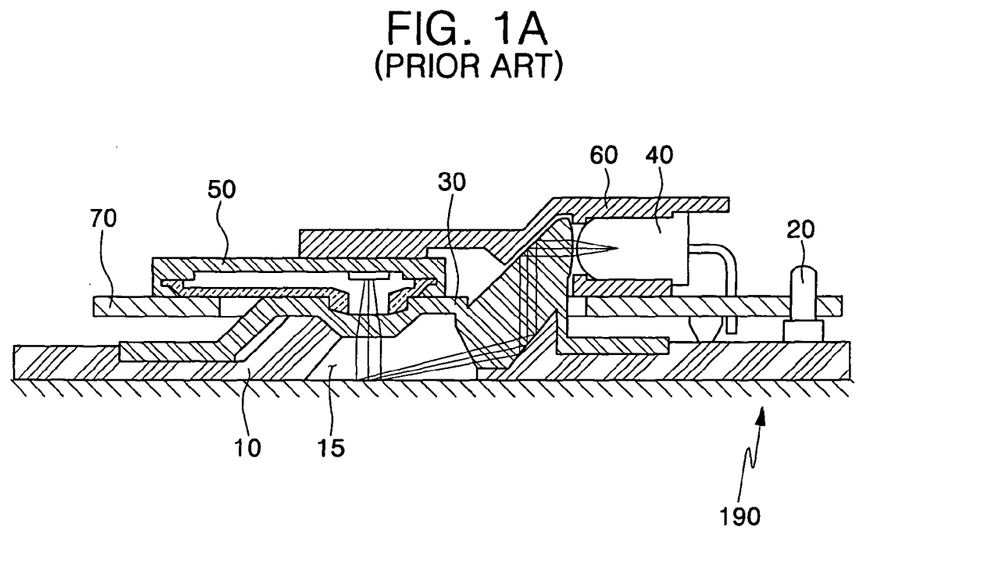
FIG. 1A is a cross-sectional view of the structure of a conventional optical pointing device.

Hereinafter, the structure of a general optical pointing device will be described in conjunction with FIG. 1A.

First, the optical pointing device generally includes a base plate 10, a lens 30 disposed on the base plate 10, and a circuit board 70 disposed on the lens 30.

The base plate 10 has a through-hole 15 formed at its center, and a positioning projection 20 for fixing a position of the circuit board 70 at its one side.

In addition, the lens 30 is mounted on the through-hole 15 formed at the center of the base plate 10.

Further, the circuit board 70 is fixed to one side of the positioning projection 20 formed at the base plate 10 to be disposed on the lens 30. An optical sensor 50 and a light source 40, such as a light emitting diode are disposed on the circuit board 70, and the optical sensor 50 is electrically connected and fixed to an upper surface of the circuit board 70. Then, a fixing clip 60 is installed on the circuit board 70 to prevent the abovementioned components from shaking due to external impact and vibration.

Hereinafter, an operation of the optical pointing device will be described. First, when light is irradiated from the light source 40, the light is reflected by a bottom surface of an object. Then, the light reflected from the bottom surface is collected through the lens 30, and the collected light is input to a sensor 50 installed at the circuit board 70. The sensor 50 for receiving the light detects movement of the pointing device relative to x and y-axes on the basis of variations of the amount of the received light, and outputs a predetermined signal according to the variations to transmit it to an MCU (not shown). Next, the signal output from the sensor 50 is transmitted to a computer main body (not shown) together with data input from an input part (not shown) such as buttons and a scroll wheel.

Figure 1B:
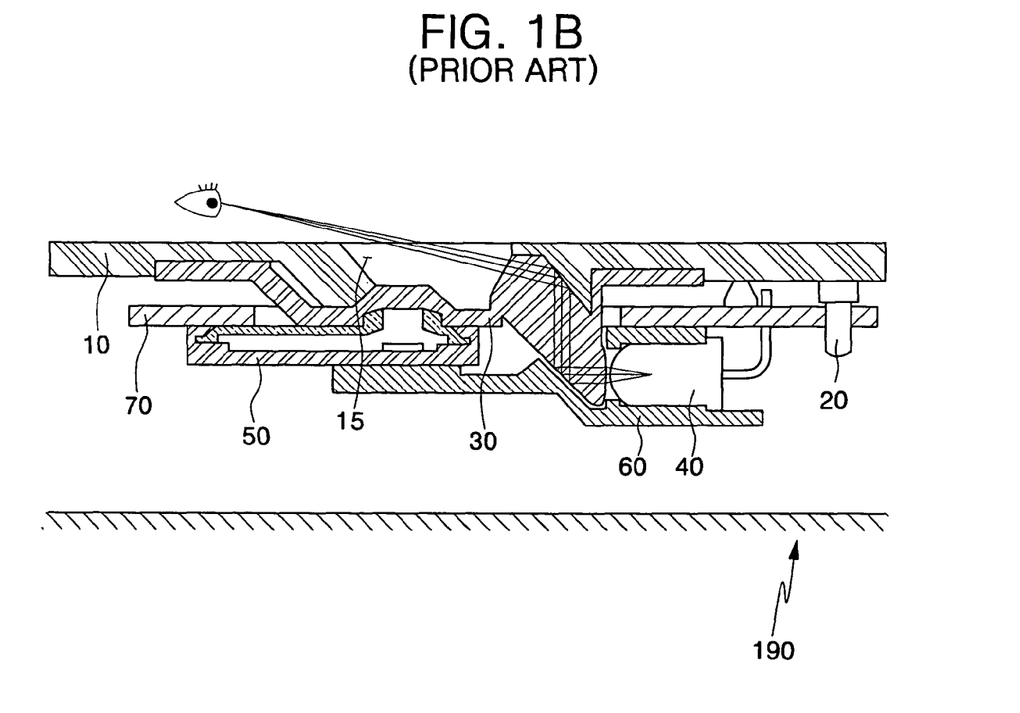
FIG. 1B is a cross-sectional view when the conventional optical pointing device is upside down.

However, in general cases, since the optical pointing device is used in contact with the bottom surface 190, a user cannot directly see the light irradiated from the optical pointing device. However, as shown in FIG. 1B, when the user intentionally turns the optical pointing device upside down to separate the base plate 10 from the bottom surface, the light irradiated from the light source is not reflected into the optical pointing device and the user can directly see the light so that the light dazzles the user's eyes. In addition, even when the optical pointing device is in an inactive state, the light irradiated from the light source is reduced, but the light source still irradiates light sufficient to dazzle the user's eyes.

SUMMARY OF THE INVENTION

In order to solve the foregoing and/or other problems, it is an aspect of the present invention to provide an optical pointing device capable of preventing light irradiated from a light source from dazzling user's eyes by blocking the light when the optical pointing device is upside down.

Additional aspect and advantages of the present invention will be set forth in part in the description which follows and, in part, will be obvious from the description, or may be learned by practice of the invention.

The foregoing and/or other aspects of the present invention may be achieved by providing an optical pointing device including: a base plate; a circuit board disposed on one side of the base plate, and having a light source irradiating light and a sensor receiving a light reflected from a working surface; a lens disposed between the base plate and the circuit board and having a light path guiding the light irradiated from the light source to the sensor; and a light blocking mean disposed on the light path to block the light path when the base plate is separated from a predetermined position.

The light blocking mean may include a blocking plate movable onto the light path, and a transparent window.

In this process, the transparent window may be disposed at one side of the blocking plate to guide the light when the base plate is located at the predetermined position.

In addition, the light blocking mean may further include a spring extending and contracting the blocking plate depending on whether the base plate is located at the predetermined position.

Further, the light blocking mean may further include a hooking threshold and a protrusion for determining a position of the transparent window by preventing the spring from extending more than a predetermined length depending on whether the base plate is located at the predetermined position.

At this time, the hooking threshold may be formed outside the spring, and the protrusion may be formed at upper outer surface of the blocking plate.

Meanwhile, the light blocking mean may include a light blocking body disposed on the light path, and having a cylindrical shape and a light through-hole formed at one side of the light blocking body.

In this process, the light blocking mean may further include a support shaft passing through and supporting the light blocking body such that the light blocking body has an eccentric weight to the bottom surface.

A washer preventing the light blocking body from separating from the support shaft may be disposed at a connection portion between the support shaft and the light blocking body.

In addition, the light blocking mean may further include a stopper disposed at one side of the light blocking body and spaced apart from the light blocking body to prevent the light blocking body supported by the support shaft from inclining more than a predetermined angle.

Further, a groove in contact with the light blocking body and having a semi-cylindrical shape may be formed at an upper surface of the stopper.

Another aspect of the present invention may be achieved by providing an optical pointing device including: a base plate; a circuit board disposed on one side of the base plate and having a light source irradiating light and a sensor receiving a light reflected from a working surface; an optical structure disposed between the base plate and the circuit board and having a light path guiding the light irradiated from the light source to the sensor; a fixing clip disposed on the circuit board to support and fix the circuit board and the optical structure to the base plate; and a light blocking mean having a blocking plate provided with one end passing through one side of the circuit board, the optical structure and the base plate to be fixed to the fixing clip and the other end projected from a lower part of the base plate, thereby blocking the light path when the base plate is separated from a predetermined position, and a transparent window formed at one side of the blocking plate to open the light path when the base plate is located on the predetermined position.

In addition, the light blocking mean may further include a spring for extending and contracting the blocking plate depending on whether the base plate is located at the predetermined position.

Further, the light blocking mean may further include a hooking threshold and a protrusion for determining a position of the transparent window by preventing the spring from extending more than a predetermined length depending on whether the base plate is located at the predetermined position.

At this time, the hooking threshold may be formed outside the spring, and the protrusion may be formed at upper outer surface of the blocking plate.

Yet another aspect of the present invention may be achieved by providing an optical pointing device including: a base plate; a circuit board disposed on one side of the base plate and having a light source irradiating light and a sensor receiving a light reflected from a working surface; an optical structure disposed between the base plate and the circuit board and having a light path guiding the light irradiated from the light source to the sensor; a fixing clip disposed on the circuit board to support and fix the circuit board and the optical structure to the base plate; and a light blocking mean having a light blocking body disposed at one side of the optical structure to block the light transmitted through the light path when the base plate is separated from a predetermined position, and a light through-hole disposed at one side of the light blocking body to pass through the light transmitted through the light path when the base plate is located at the predetermined position.

In this process, the light blocking mean may further include a support shaft passing through and supporting the light blocking body such that the light blocking body has an eccentric weight to the bottom surface.

A washer preventing the light blocking body from separating from the support shaft may be disposed at a connection portion between the support shaft and the light blocking body.

In addition, the light blocking mean may further include a stopper disposed at one side of the light blocking body and spaced apart from the light blocking body to prevent the light blocking body supported by the support shaft from inclining more than a predetermined angle.

Further, a groove in contact with the light blocking body and having a semi-cylindrical shape may be formed at an upper surface of the stopper.

BRIEF DESCRIPTION OF THE DRAWINGS

These and/or other aspects and advantages of the present invention will become apparent and more readily appreciated from the following description of the embodiments, taken in conjunction with the accompanying drawings of which.

DETAILED DESCRIPTION OF THE INVENTION

Reference will now be made in detail to the embodiments of the present invention, examples of which are illustrated in the accompanying drawings, wherein like reference numerals refer to the like elements throughout. The embodiments are described below in order to explain the present invention by referring to the figures.

Figure 2A:
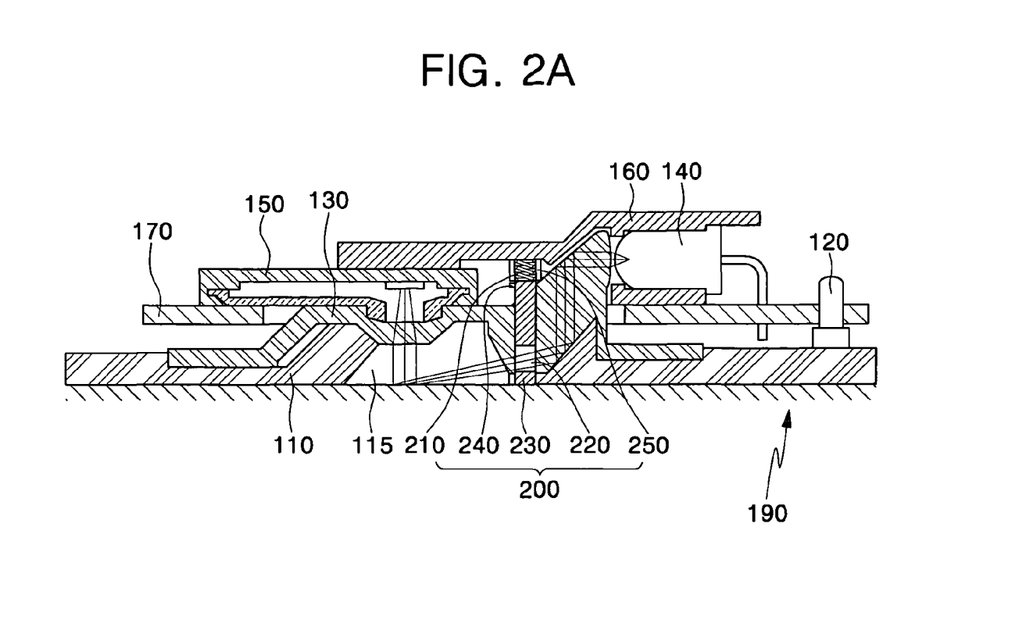
FIG. 2A is a cross-sectional view of an optical pointing device in accordance with an exemplary embodiment of the present invention.

FIG. 2A is a cross-sectional view of an optical pointing device in accordance with an exemplary embodiment of the present invention.

Referring to FIG. 2A, the optical pointing device includes a main body (not shown), and a base plate 110 engaged with the main body and having a positioning projection 120 formed at its one side and a through-hole 115. An optical structure 130 is disposed on the base plate 110. Here, the optical structure 130 has a light path for guiding light irradiated from a light source, which is to be described later.

A circuit board 170 is installed on the optical structure 130, and one end of the positioning projection 120 formed at the base plate 110 is fixed to the circuit board 170. Here, the circuit board 170 includes a sensor 150 electrically connected and fixed to the circuit board 170 and a light source 140 irradiating light, such as a light emitting diode. Additionally, a fixing clip 160 is installed on the circuit board 170 to prevent the abovementioned components such as the circuit board 170, the optical structure 130 and the base plate 110 from shaking due to external impact and vibration.

Meanwhile, the optical pointing device in accordance with the present invention includes a light blocking mean 200 movable on the light path guiding light irradiated from the light source 140 depending on whether the base plate 110 is located on a predetermined position, i.e., depending on the case that the base plate 110 is in contact with a bottom surface 190 or the base plate 110 is separated from the bottom surface 190 so that the base plate is not horizontal with the bottom surface 190.

Figure 2B:
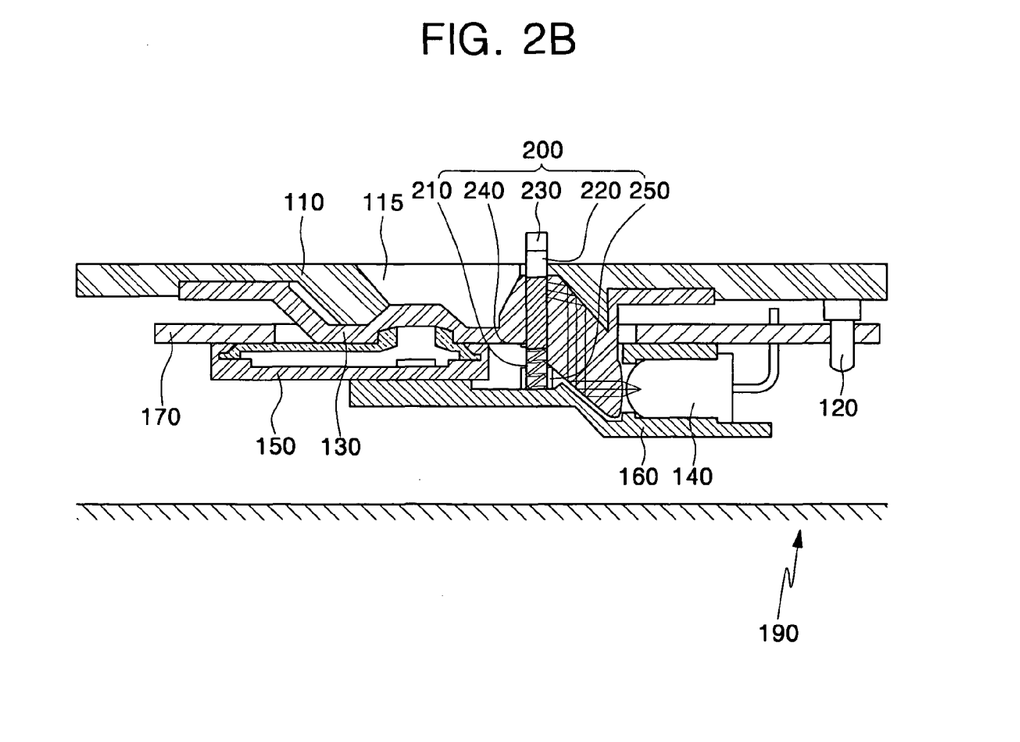
FIG. 2B is a cross-sectional view when the optical pointing device is upside sown in accordance with an exemplary embodiment of the present invention.

Specifically describing the light blocking mean 200, as shown in FIGS. 2A and 2B, the light blocking mean 200 passes through the base plate 110 and the optical structure 130 to be fixed to a lower part of the fixing clip 160. In this process, the light blocking mean 200 includes a blocking plate 230 movable on the light path to block light, and a transparent window 220 disposed at one side of the blocking plate 230 to transmit the light.

Preferably, the blocking plate 230 is formed of a non-transparent material such as plastic to block the light irradiated from the light source 140, and the transparent window 220 is formed of a transparent material such as transparent acryl to transmit the light irradiated from the light source 140.

In addition, the light blocking mean 200 further includes a spring 210 fixed to an upper part of the blocking plate 230 at its lower end, and fixed to a lower surface of the fixing clip 160 at its upper end. In this process, the spring 210 functions to change a position of the transparent window 220 by extending and contracting the blocking plate 230 depending on whether the base plate 110 is located at the predetermined position.

Further, a hooking threshold 250 is formed outside the spring 210. The blocking plate 230 has a protrusion 240 formed at one side of its outer surface, stopped by the hooking threshold 250 to prevent the spring 230 from contracting more than a predetermined length, and stopped by an upper surface of the optical structure 130 to prevent the blocking plate 230 from going out more than a predetermined extent. That is, the protrusion 240 is movable between the lower surface of the hooking step 250 and the upper surface of the optical structure 130 depending on the extension and contraction of the spring 210.

Hereinafter, another embodiment of a light blocking mean installed in the optical pointing device in accordance with the present invention will be described.

For the sake of understanding, like reference numerals designate like parts throughout the specification.

Figure 3A:
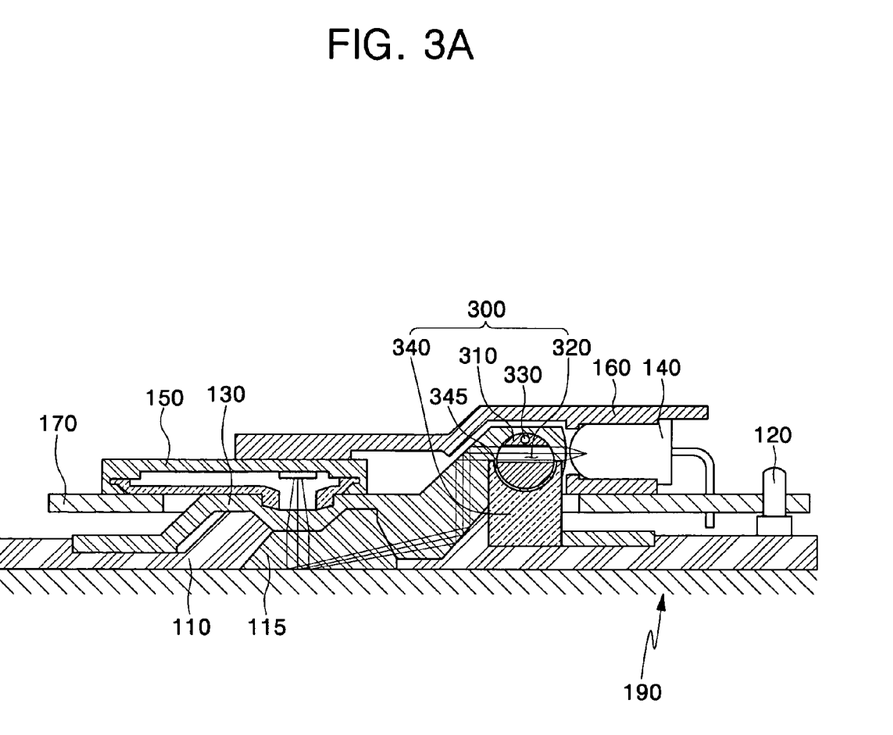
FIG. 3A is a cross-sectional view of an optical pointing device in accordance with another exemplary embodiment of the present invention.
Figure 3B:
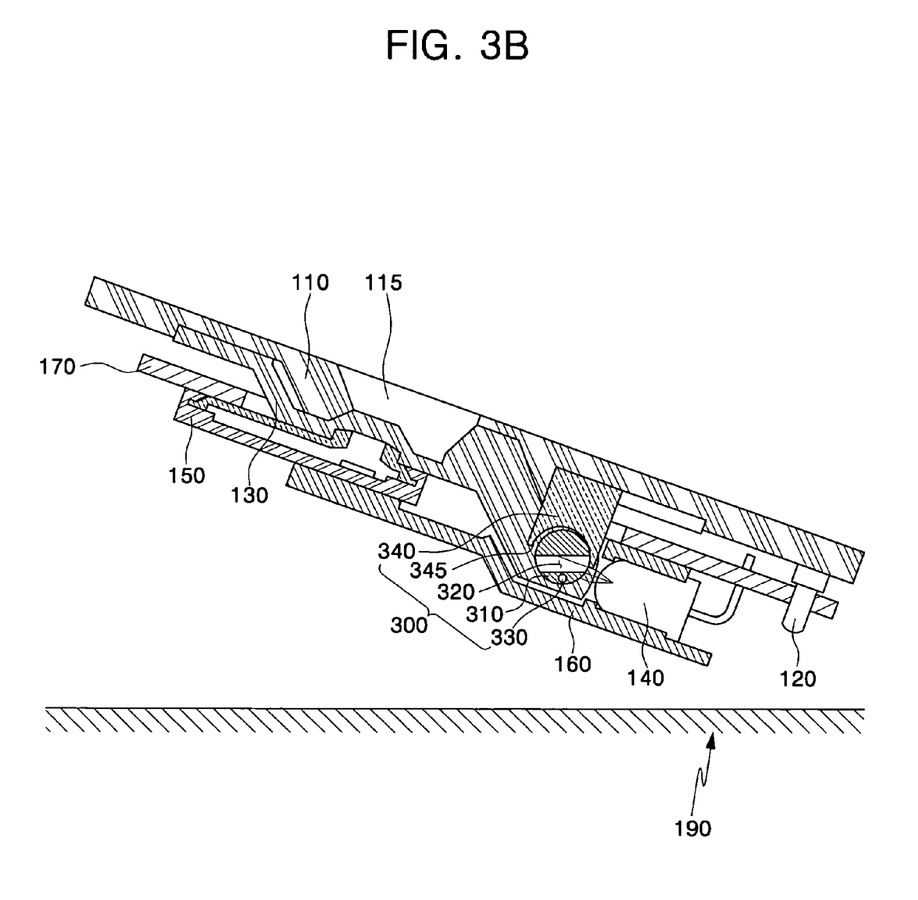
FIG. 3B is a cross-sectional view when the optical pointing device is upside down in accordance with another exemplary embodiment of the present invention.
Figure 3C:
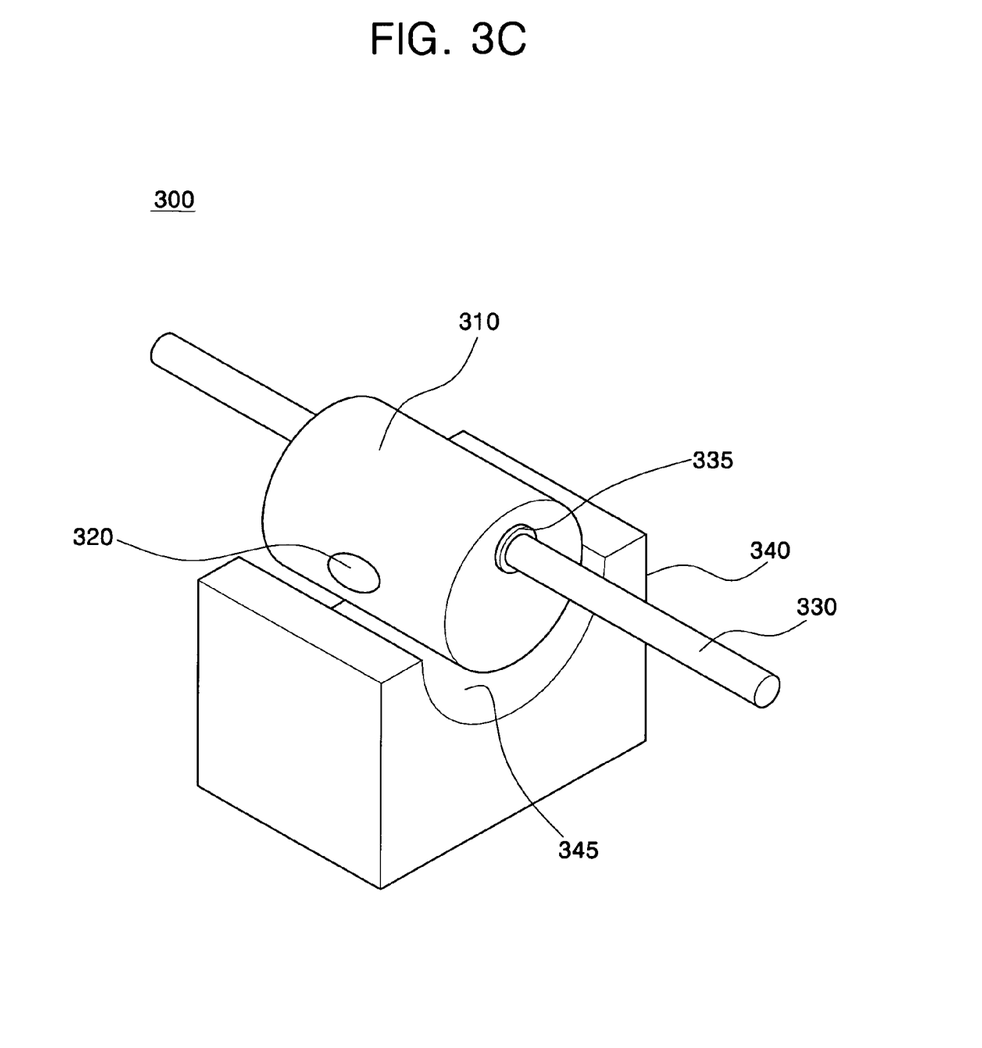
FIG. 3C is a perspective view of a light blocking mean of FIG. 3A.

Referring to FIGS. 3A to 3C, a light blocking mean 300 is located on a light path formed at an optical structure 130 to guide light irradiated from a light source 140, similar to that of the aforementioned embodiment.

In this process, the light blocking mean 300 includes a light blocking body 310 having a cylindrical shape and disposed at one side of the optical structure 130, and the light blocking body 310 has a light through-hole 320 transmitting light. The light through-hole 320 may be formed at a position such that the light is normally transmitted through the light through-hole 320 to be directed to a bottom surface 190 when a base plate 110 is located at a predetermined position, i.e., the base plate 110 is in contact with the bottom surface 190.

In addition, the light blocking body 310 includes a support shaft 330 passing through the light blocking body 310 to support the light blocking body 310 in a state that the light blocking body 310 is spaced apart from the optical structure 130. A washer 335 is installed at a connection portion between the support shaft 330 and the light blocking body 310 to prevent the light blocking body 310 from separating from the support shaft 330. In this process, the light blocking body 310 may be supported by the support shaft 330 to have an eccentric weight to the bottom surface 190.

Further, disposed under the light blocking body 310 is a stopper 340 spaced apart from a lower part of the light blocking body to prevent the light blocking body 310 supported by the support shaft 330 from inclining more than a predetermined angle depending on a position of the base plate 110. The stopper 340 has a semi-circular groove 345 formed at an upper surface thereof to be in contact with the light blocking body 310 when the light blocking body 310 is inclined more than the predetermined angle.

Hereinafter, operation and effect of the optical pointing device in accordance with the present invention will be described.

First, describing an embodiment of the optical pointing device in accordance with the present invention with reference to FIG. 2B, when the optical pointing device is in contact with the bottom surface, i.e., when the base plate 110 is located at the predetermined position, the blocking plate 230 of the light blocking mean 200 is pressed by the bottom surface 190 to be pushed into the optical pointing device.

On the other hand, when the blocking plate 230 is located in the optical pointing device, the transparent window 220 formed at one side of the blocking plate 230 is located at a position such that the light irradiated from the light source 140 is directed to the bottom surface 190. As a result, the light transmitted through the transparent window 220 to be directed to the bottom surface 190 is reflected by the bottom surface 190. Then, the light reflected by the bottom surface 190 is collected by the optical structure 130 to be input into the sensor 150, and the sensor 150 transmits movement of the optical pointing device to a computer (not shown).

On the contrary, when the optical pointing device is lifted up or upside down, i.e., when the base plate 110 is separated from a predetermined position, the blocking plate 230 is not in contact with the bottom surface 190 to make the spring 210 connected to an upper part of the blocking plate 230 extend.

Then, when the spring 210 extends, the blocking plate 230 goes out from the base plate 110 until the protrusion 240 is in contact with the upper surface of the optical structure 130.

At this time, when the blocking plate 230 is pushed out from the base plate 110, the transparent window 220 formed at one side of the blocking plate 230 is also pushed out. As a result, the light irradiated from the light source 140 is blocked by the blocking plate 230, not transmitted through the transparent window 220.

Similarly, describing another embodiment of the light blocking mean installed in the optical pointing device in accordance with the present invention with reference to FIGS. 3A and 3B, when the optical pointing device is in contact with the bottom surface 190, i.e., the base plate 110 is located at a predetermined position, the light irradiated from the light source 140 passes through the light through-hole 320 of the light blocking body 310 disposed on the light path of the optical structure 130 to be directed to the bottom surface 190.

As a result, the light transmitted through the light through-hole 320 and directed to the bottom surface 190 is reflected by the bottom surface 190. Then, the reflected light is collected through the optical structure 130 to be input into the sensor 150, and the sensor 150 transmits the movement of the optical pointing device to a computer (not shown).

Meanwhile, when the pointing device is lifted up from the bottom surface 190 or upside down, i.e., when the base plate 110 is separated from a predetermined position, the position of the light blocking body 310 having an eccentric weight to the bottom surface 190 and supported by the support shaft 330 is changed. At this time, when the position of the light blocking body 310 is changed, the position of the light through-hole 320 formed at one side of the light blocking body 310 is also changed.

As a result, the light irradiated from the light source 140 and flowing through the light path is blocked by the light blocking body 310, not transmitted through the light through hole 320.

As can be seen from the foregoing, the present invention is capable of blocking the light irradiated from the light source using the light blocking mean when the optical pointing device with the light blocking mean is upside down to prevent the light from dazzling the user's eyes.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. An optical pointing device comprising:
   a base plate;
   a circuit board disposed on one side of the base plate, and having a light source irradiating light and a sensor receiving a light reflected from a working surface;
   an optical structure disposed between the base plate and the circuit board and having a light path guiding the light irradiated from the light source to the sensor;
   a light blocking mean disposed on the light path to block the light path when the base plate is separated from a predetermined position,
   wherein the light blocking mean comprises a blocking plate movable onto the light path, and a transparent window, and
   wherein the transparent window is disposed at one side of the blocking plate to guide the light when the base plate is located at the predetermined position.

2. The optical pointing device according to claim 1, wherein the light blocking mean further comprises a spring extending and contracting the blocking plate depending on whether the base plate is located at the predetermined position.

3. The optical pointing device according to claim 2, wherein the light blocking mean further comprises a hooking threshold and a protrusion for determining a position of the transparent window by preventing the spring from extending more than a predetermined length depending on whether the base plate is located at the predetermined position.

4. The optical pointing device according to claim 3, wherein the hooking threshold is formed outside the spring, and the protrusion is formed at upper outer surface of the blocking plate.

5. An optical pointing device comprising:
   a base plate;
   a circuit board disposed on one side of the base plate, and having a light source irradiating light and a sensor receiving a light reflected from a working surface;
   an optical structure lens disposed between the base plate and the circuit board, and having a light path guiding the light irradiated from the light source to the sensor; and
   a light blocking mean including:
      a light blocking body disposed at one side of the optical structure to block the light transmitted through the light path when the base plate is separated from a predetermined position, and
      a light through-hole disposed at one side of the light blocking body to pass through the light transmitted through the light path when the base late is located at the predetermined position;
   wherein the light blocking body is formed by cylindrical shape.

6. The optical pointing device according to claim 5, wherein the light blocking mean further comprises a support shaft passing through and supporting the light blocking body such that the light blocking body has an eccentric weight to the bottom surface.

7. The optical pointing device according to claim 6, wherein a washer preventing the light blocking body from separating from the support shaft is disposed at a connection portion between the support shaft and the light blocking body.

8. The optical pointing device according to claim 5, wherein the light blocking mean further comprises a stopper disposed at one side of the light blocking body and spaced apart from the light blocking body to prevent the light blocking body supported by the support shaft from inclining more than a predetermined angle.

9. The optical pointing device according to claim 8, wherein a groove contacting the light blocking body and having a semi-cylindrical shape is formed at an upper surface of the stopper.

10. An optical pointing device comprising:
    a base plate;
    a circuit board disposed on one side of the base plate, and having a light source irradiating light and a sensor receiving a light reflected from a working surface;
    an optical structure disposed between the base plate and the circuit board, and having a light path guiding the light irradiated from the light source to the sensor; and
    a light blocking mean having a blocking plate passed through the circuit board, the optical structure and the base plate to be disposed on the light path to block the light transmitted through the light path when the base plate is separated from a predetermined position, and a transparent window formed at one side of the blocking plate to open the light path when the base plate is located at the predetermined position.

11. The optical pointing device according to claim 10, wherein the light blocking mean further comprises a spring extending and contracting the blocking plate depending on whether the base plate is located at the predetermined position.

12. The optical pointing device according to claim 11, wherein the light blocking mean further comprises a hooking threshold and a protrusion for determining a position of the transparent window by preventing the spring from extending more than a predetermined length depending on whether the base plate is located at the predetermined position.

13. The optical pointing device according to claim 12, wherein the hooking threshold is formed outside the spring, and the protrusion is formed at upper outer surface of the blocking plate.

14. An optical pointing device comprising:
    a base plate;
    a circuit board disposed on one side of the base plate, and having a light source irradiating light and a sensor receiving a light reflected from a working surface;
    an optical structure lens disposed between the base plate and the circuit board, and having a light path guiding the light irradiated from the light source to the sensor; and
    a light blocking mean having a light blocking body disposed at one side of the optical structure to block the light transmitted through the light path when the base plate is separated from a predetermined position, and a light through-hole disposed at one side of the light blocking body to pass through the light transmitted through the light path when the base plate is located at the predetermined position.

15. The optical pointing device according to claim 14, wherein the light blocking mean further comprises a support shaft passing through and supporting the light blocking body such that the light blocking body has an eccentric weight to the bottom surface.

16. The optical pointing device according to claim 15, a washer preventing the light blocking body from separating from the support shaft is disposed at a connection portion between the support shaft and the light blocking body.

17. The optical pointing device according to claim 14, wherein the light blocking mean further comprises a stopper disposed at one side of the light blocking body and spaced apart from the light blocking body to prevent the light blocking body supported by the support shaft from inclining more than a predetermined angle.

18. The optical pointing device according to claim 17, wherein a groove contacting the light blocking body and having a semi-cylindrical shape may be formed at an upper surface of the stopper.

* * * * *